L. E. PITTONI.
HAMMOCK SUSPENSION.
APPLICATION FILED AUG. 20, 1920.

1,355,356. Patented Oct. 12, 1920.

INVENTOR
LOUIS E. PITTONI
BY
ATTORNEY.

UNITED STATES PATENT OFFICE.

LOUIS E. PITTONI, OF NEW YORK, N. Y., ASSIGNOR TO MANHATTAN-ROME COMPANY, BRANCH OF ROME METALLIC BEDSTEAD CO., OF LONG ISLAND CITY, NEW YORK, A CORPORATION OF NEW YORK.

HAMMOCK SUSPENSION.

1,355,356.  Specification of Letters Patent.  Patented Oct. 12, 1920.

Application filed August 20, 1920. Serial No. 404,815.

*To all whom it may concern:*

Be it known that I, LOUIS E. PITTONI, a subject of the King of Italy, residing at New York city, county of Queens, and State of New York, have invented certain new and useful Improvements in Hammock Suspensions, the following being a full, clear, and exact disclosure of the one form of my invention which I at present deem preferable.

For a detailed description of the present form of my invention, reference may be had to the following specification and to the accompanying drawing forming a part thereof, in which—

Figure 1:
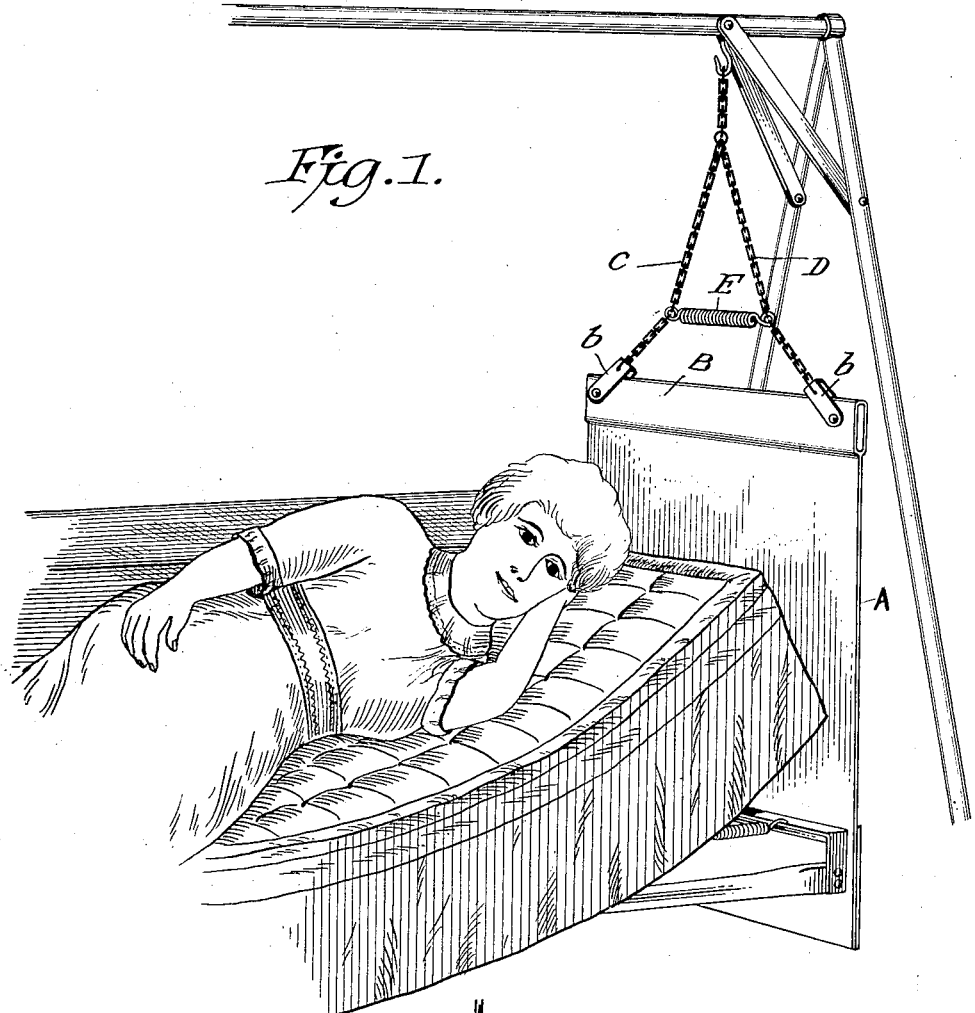

Figure 1 shows one form of my invention and

Figure 2:
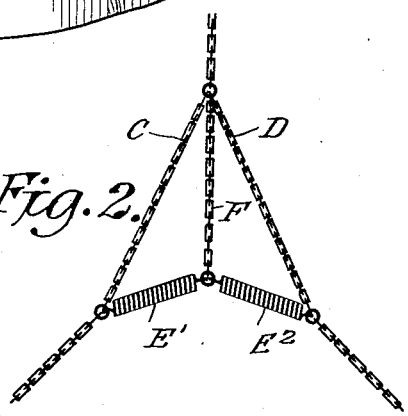

Fig. 2 a modification thereof.

My invention involves a flexible suspension for couch hammocks. As appears in the drawing, A represents one end of a couch hammock, the other end being a duplicate of the one shown. The hammock is supported from the inclosed edge-bar B at each end by two converging chains C and D which are joined to the bar by chains $b\ b$. Ropes instead of chains may be used with the same effect. Between the chains C and D is connected a horizontal spring link of a length which will cause the chains to assume an angular route from their lower to their upper ends. It will be manifest that when weight is imposed on the hammock, it will tend to straighten out the chains against the force of spring E which tends to draw them together, so that the hammock and its load will have a resilient spring support. The advantages of my arrangement are that a much smaller spring is required than is needed when a spring, or springs, is inserted directly in the line of support of the hammock, since only a fractional component of the weight comes on the spring. It affords moreover an equally effective spring support which is also easier and less jumpy.

In Fig. 2 a pair of springs $E^1$ and $E^2$ are employed with an intermediate chain F extended from a point between the adjacent ends of the springs and the junction of chains C and D.

What I claim as new and desire to secure by Letters Patent is:

1. A hammock-support comprising chains or ropes and horizontally acting springs tending to divert the chains or ropes from a straight line whereby the suspended weight will impose tension on the springs by its tendency to straighten the chains or ropes.

2. A hammock-support comprising a pair of converging chains or ropes and an intermediate spring tending to distort the chains or ropes from a straight line whereby the suspended weight will impose tension on the spring by tending to straighten the chains or ropes.

Signed at Long Island City, N. Y., August 19th, 1920.

LOUIS E. PITTONI.